United States Patent
Qi et al.

(10) Patent No.: US 9,875,101 B1
(45) Date of Patent: Jan. 23, 2018

(54) INDUCTION VARIABLE IDENTIFICATION

(71) Applicant: MARVELL INTERNATIONAL LTD., Hamilton (BM)

(72) Inventors: Xinyu Qi, Shanghai (CN); Liping Gao, Shanghai (CN); Haitao Huang, Shanghai (CN); XingXing Pan, Shanghai (CN); Pengfei Li, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 15/238,879

(22) Filed: Aug. 17, 2016

Related U.S. Application Data

(60) Provisional application No. 62/206,002, filed on Aug. 17, 2015.

(51) Int. Cl.
*G06F 9/45* (2006.01)
*G06F 9/30* (2006.01)

(52) U.S. Cl.
CPC ........ *G06F 9/30032* (2013.01); *G06F 9/3001* (2013.01); *G06F 9/30101* (2013.01); *G06F 9/30145* (2013.01)

(58) Field of Classification Search
CPC . G06F 9/3001; G06F 9/30101; G06F 9/30145

USPC .......................................................... 717/140
See application file for complete search history.

(56) References Cited

U.S. PATENT DOCUMENTS

| | | | | |
|---|---|---|---|---|
| 6,035,124 | A * | 3/2000 | Ng ........................ | G06F 8/433 717/146 |
| 6,651,247 | B1 * | 11/2003 | Srinivasan ............ | G06F 8/4452 712/226 |
| 8,458,671 | B1 * | 6/2013 | Hostetter ................ | G06F 8/434 717/131 |
| 2010/0023931 | A1 * | 1/2010 | Cheng ..................... | G06F 8/433 717/156 |

* cited by examiner

*Primary Examiner* — Anna Deng

(57) ABSTRACT

Aspects of the disclosure provide a method for identifying an induction variable in a loop during a compiling process. The method includes searching for a phi-function that includes a first operand and a second operand and defines a candidate basic induction variable (BIV), searching for an add/sub instruction that has a first register and a second register wherein the first register is the second operand of the phi-function, or the value in the first register is subsequently stored to the second operand of the phi-function through one or more move instructions, and determining the candidate BIV is a BIV when the second register of the add/sub instruction is the candidate BIV or stores a value that is passed from the candidate BIV through one or more move instructions.

16 Claims, 9 Drawing Sheets

```
for (int i = 0; i<1000; i++) {
    ...
}
```
                                    ← 200

FIG. 2

```
const v3, #0
loop_head:
    if-ge v3, #1000, goto exit
loop_body_1:
    ...
    move v1, v3
    ...
    add-const v2, v1, #1
    ...
    move v3, v2
    ...
    goto loop_head
exit:
```
                                    ← 300

FIG. 3

```
const v3_0, #0
loop_head:
    v3_1 = phi (v3_0, v3_2)   ← 401
    if-ge v3_1, #1000, goto exit          } 402
loop_body_1:
    ...
    move v1_0, v3_1
    ...
    add v2_0, v1_0, #1
    ...
    move v3_2, v2_0
    ...
    goto loop_head
exit:
```
                                    ← 400

FIG. 4

```
loop_head:
    ...
    Phi v3_7 = (v3_6, v3_8)
    if-ge v3_7, v14_0, goto exit          ⟶ 810
loop_body_1:
    add-int v4_8, v3_7, v16_0
    aget-wide v4_9, v15_0, v4_8  ⟶ 841
    add-int v6_5, v3_7, v19_0
    aget-wide v6_6, v18_0, v6_5  ⟶ 842
    ...
    add-int/lit8 v1_16, v3_7, #1  ⟶ 820
    move v3_8, v1_16  ⟶ 830
    ...
    goto loop_head
exit
```

*FIG. 8*

```
loop_head:
...
--Phi v3_7 = (v3_6, v3_8)
--if-ge v3_7, v14_0, goto exit
    ldr    r0, [sp, #136]
    cmp    r5, r0
    bge    0x00000090
loop_body_1:
--add-int v4_8, v3_7, v16_0
    adds   r6, r5, r11
--aget-wide v4_9, v15_0, v4_8        ⎫ 941
    cmp    r10, #0                   ⎫
    beq    0x000001c0                ⎬ 951
    adds   r2, r10, r6, lsl 3        ⎭
    ldr    r1, [r10, #8]             ⎫
    cmp    r6, r1                    ⎬ 952
    bcs    0x000001c6                ⎭
    vldr   d10, [r2, #16]
--add-int v6_5, v3_7, v19_0
    ldr    r3, [sp, #156]
    adds   r8, r5, r3
--aget-wide v6_6, v18_0, v6_5        ⎫ 942
    ldr    r12, [sp, #152]           
    cmp    r12, #0                   ⎫
    beq    0x000001ce                ⎬ 961
    adds   r1, r12, r8, lsl 3        ⎭
    ldr    r0, [r12, #8]             ⎫
    cmp    r8, r0                    ⎬ 962
    bcs    0x000001d4                ⎭
    vldr   d8, [r1, #16]
...
--add-int/lit8 v1_16, v3_7, #1
    adds   r7, r5, #1
--move v3_8, v1_16
    movs   r5, r7
...
--goto loop_head
    b      0x000001de
```

--loop-outside null check and index range check of "aget-wide v4_9, v15_0, v4_8"
       ...
1010 ⎯⎯ --loop-outside null check and index range check of "aget-wide v6_6, v18_0, v6_5"
       ...
1020 ⎯⎯ loop_head:
       ...
       --Phi v3_7 = (v3_6, v3_8)
       --if-ge v3_7, v14_0, goto exit
          ldr    r12, [sp, #136]
          cmp    r5, r12
          bge    0x00000090
       loop_body_1:
       --add-int v4_8, v3_7, v16_0
          adds   r6, r5, r11
       --aget-wide v4_9, v15_0, v4_8  ⎯⎮
          adds   r0, r10, r6, lsl 3    ⎬⎯ 1041
          vldr   d10, [r0, #16]       ⎯⎮
       --add-int v6_5, v3_7, v19_0
          ldr    r1, [sp, #156]
          adds   r8, r5, r1
       --aget-wide v6_6, v18_0, v6_5  ⎯⎮
          ldr    r2, [sp, #152]        ⎬⎯ 1051
          adds   r3, r2, r8, lsl 3    ⎯⎮
          vldr   d8, [r3, #16]
       ...
       --add-int/lit8 v1_16, v3_7, #1
          adds   r7, r5, #1
       --move v3_8, v1_16
          movs   r5, r7
       ...
       --goto loop_head
          b      0x00000212
```

FIG. 10

INDUCTION VARIABLE IDENTIFICATION

INCORPORATION BY REFERENCE

This present disclosure claims the benefit of U.S. Provisional Application No. 62/206,002, "Bytecode-friendly Identification for Loop Basic Induction Variable and Dependent Basic Induction Variable" filed on Aug. 17, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A process virtual machine in a mobile device can include a just-in-time (JIT) compiler or an ahead-of-time compiler (AOT). The JIT compiler can dynamically compile frequently executed short segments of bytecode of an application into native machine code while the application is running. An AOT compiler can compile entire bytecode of an application into native machine code upon installation of the application which are later executed. Code optimizations, such as loop optimizations, can be performed by the JIT compiler or AOT compiler during the compiling processes.

SUMMARY

Aspects of the disclosure provide a method for identifying an induction variable in a loop during a compiling process. The loop is in static single assignment (SSA) form and includes a loop head and a loop body. The method includes searching in the loop head for a phi-function that includes a first operand and a second operand and defines a candidate basic induction variable (BIV), and searching in the loop body for an add/sub instruction that has a first register and a second register wherein the first register stores a value that is a sum or difference of values of the second register and a constant as a result of the add/sub operation, and wherein the first register is the second operand of the phi-function, or the value in the first register is subsequently stored to the second operand of the phi-function through one or more move instructions in the loop body.

The method further includes determining whether the second register of the add/sub instruction is the candidate BIV or stores a value that is passed from the candidate BIV through one or more move instructions in the loop body, and determining the candidate BIV is a BIV when the second register of the add/sub instruction is the candidate BIV or stores a value that is passed from the candidate BIV through one or more move instructions in the loop body.

In an embodiment, searching in the loop body for an add/sub instruction includes searching for an instruction that defines the second operand of the phi-function in the loop body, and determining whether the instruction that defines the second operand of the phi-function is an add/sub instruction.

In an embodiment, searching in the loop body for an add/sub instruction further includes (i) determining whether the instruction that defines the second operand of the phi-function is a move instruction when the instruction that defines the second operand of the phi-function is not an add/sub instruction, (ii) when the instruction that defines the second operand of the phi-function is a move instruction, searching for an instruction that defines a source register of the move instruction, (iii) determining whether the instruction that defines the source register of the move instruction is an add/sub instruction, (iv) when the instruction that defines the source register of the move instruction is not an add/sub instruction, determining whether the instruction that defines the source register of the move instruction is another move instruction, and (v) when the instruction that defines the source register of the move instruction is another move instruction, searching for an instruction that defines a source register of the other move instruction.

In an embodiment, determining whether a second register of the add/sub instruction stores a value that is passed from the candidate BIV through one or more move instructions in the loop body includes searching for an instruction that defines the second register of the add/sub instruction, determining whether the instruction that defines the second register of the add/sub instruction is a move instruction whose source register is the candidate BIV, and when the instruction that defines the second register of the add/sub instruction is a move instruction whose source register is not the candidate BIV, searching for an instruction that defines the source register of the move instruction.

In one embodiment, the method further includes searching in the loop head for another phi-function that includes a first operand and a second operand and defines a candidate basic induction variable (BIV). In another embodiment, the method further includes determining the value of the constant in the add/sub instruction is a step value of the BIV.

In a further embodiment, the method further includes determining the first register of the add/sub instruction is a dependent induction variable (DIV) of the BIV, and determining a destination register in a move instruction in the loop body is a DIV of the BIV when the destination register in the move instruction stores a value that is passed from the candidate BIV or that is passed from the first register of the add/sub instruction through one or more move instructions.

In one example, the first register and the second register of the add/sub instruction are a same register that stores a value that is a sum or difference of an initial value of the same register and a value of the constant as a result of the add/sub operation. In another example, the add/sub instruction includes a third register storing the constant. In a further example, the loop is transformed to an optimized form based on the identified BIVs or/and DIVs.

Aspects of the disclosure provide an apparatus for identifying an induction variable in a loop during a compiling process. The loop is in SSA form and includes a loop head and a loop body. The apparatus includes a processor configured to execute instructions, and a memory configured to store instructions for causing the processor to search in the loop head for a phi-function that includes a first operand and a second operand and defines a candidate BIV, and to search in the loop body for an add/sub instruction that has a first register and a second register, wherein the first register stores a value that is a sum or difference of values of the second register and a constant as a result of the add/sub operation, and wherein the first register is the second operand of the phi-function, or the value in the first register is subsequently stored to the second operand of the phi-function through one or more move instructions in the loop body. The memory is further configured to store instructions for causing the processor to determine whether the second register of the add/sub instruction is the candidate BIV or stores a value that is passed from the candidate BIV through one or more move instructions in the loop body, and to determine the candidate BIV is a BIV when the second register of the add/sub instruction is the candidate BIV or stores a value that is passed from the candidate BIV through one or more move instructions in the loop body.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows a first code fragment of a loop in form of a high level language;

FIG. 3 shows a second code fragment of the loop in form of bytecode corresponding to a virtual machine;

FIG. 4 shows a third code fragment of the loop in SSA form;

FIG. 8 shows a code fragment of a loop in SSA form;

FIG. 9 shows a code fragment of native machine code; and

FIG. 10 shows another code fragment of native machine code.

DETAILED DESCRIPTION OF EMBODIMENTS

Figure 1:
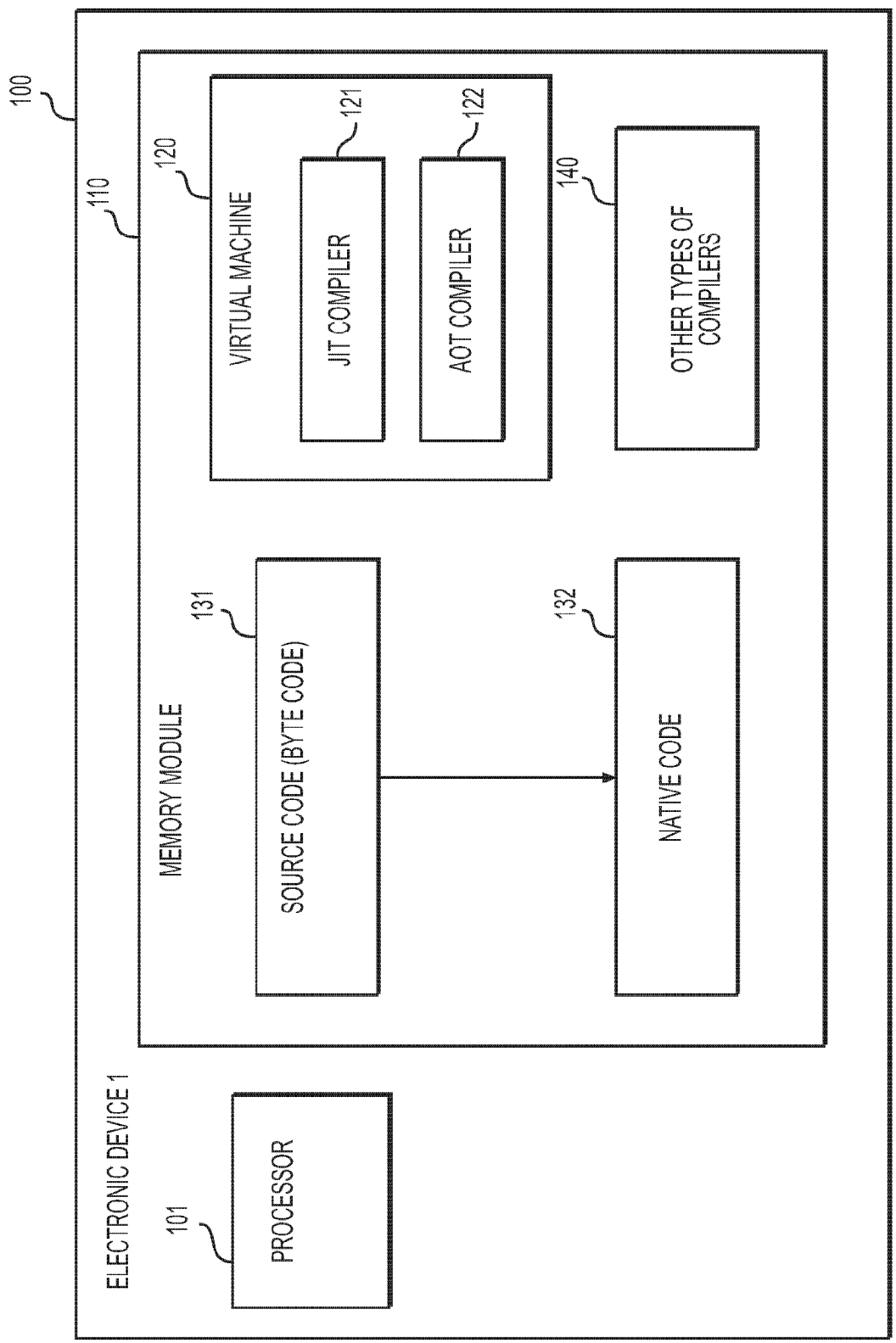
FIG. 1 shows a block diagram of an electronic device according to an embodiment of the disclosure.

FIG. 1 shows a block diagram of an electronic device 100 according to an embodiment of the disclosure. The electronic device 100 includes hardware components, such as a processor 101, a memory module 110, and the like, as well as software components, such as various code instructions stored in the memory module 110. The hardware components operate according to the software components to perform various tasks.

In an embodiment, the electronic device 100 includes a compiler, such as a just-in-time (JIT) compiler 121, an ahead-of-time (AOT) compiler 122, and the like, in the software components. The compiler, when executed by the processor 101, performs a compiling process to convert source code to target code, such as native code (also referred to as native machine code) that can be directly executed by the processor 101, and meanwhile performs code optimization during the compiling process. Particularly, the compiler identifies basic induction variables (BIVs) and dependent induction variables (DIV) in a loop during the compiling process. The identified BIVs and DIVs provide a basis for later loop optimization operations.

The electronic device 100 can be any suitable device, such as a desktop computer, a laptop computer, a mobile phone, a tablet, a multimedia player, a pocket calculator, a personal digital assistant (PDA), a smart watch, and the like. The electronic device 100 can include other suitable components (not shown), such as a display, a touchscreen, a microphone, a communication component, and the like. In an embodiment, the electronic device 100 includes a single integrated circuit (IC) chip that integrates various circuits, such as the processor 101, the memory module 110, and the like, on the single IC chip. In another embodiment, the electronic device 100 includes multiple IC chips, such as a processor chip, a memory chip, and the like.

The processor 101 includes one or more processing units to execute various code instructions to perform various tasks. In an example, the processor 101 is a multi-core processor, such as a dual-core processor, a quad-core processor, and the like. Further, the processor 101 can have any suitable architecture, such as an x86 architecture, a reduced instruction set computing (RISC) architecture, a complex instruction set computing (CISC) architecture, and the like. In an example, the electronic device 100 is a mobile device having an advanced RISC machine (ARM) type processor. The code instructions can be low level code, such as native code, that can be directly executed by the processor 101 or can be code written with high level programing languages, such as in Java language, in C language, and the like, that can be translated to the native code and then executed.

The memory module 110 includes one or more storage media that provide memory spaces for various storage needs. In an example, the memory module 110 stores code instructions to be executed by the processor 101 and stores data to be processed by the processor 101. In another example, the memory module 110 includes memory spaces allocated for system storage, and user storage. The storage media include, but are not limited to, hard disk drive, optical disc, solid state drive, read-only memory (ROM), dynamic random access memory (DRAM), static random access memory (SRAM), flash memory, and the like.

In one example, a memory space 120 is allocated in the memory module 110 to store a virtual machine program. The virtual machine program can be executed to start an instance of virtual machine that can be used for executing bytecode of an application program. For example, an application program can be generated using a high level programming language, such as Java, Python, and the like, and subsequently a compiler can be used to transform the application program to bytecode corresponding to a type of virtual machine. The byte code can be, for example, downloaded from the Internet and stored in the memory module 110 and executed later by a virtual machine of the same type. In various examples, the virtual machine can be of various types, such as a Java virtual machine, a Dalvik virtual machine, an Android Runtime (ART) virtual machine, and the like.

In one example, the virtual machine program in the memory space 120 includes a JIT compiler 121 that, when executed by the processor 101, compiles frequently executed instructions into native code which can be executed by the processor 101. For example, instructions in a loop are frequently executed, and the JIT compiler 121 compiles the instructions in the loop into native code. In another example, the virtual machine program in the memory space 120 includes an AOT compiler 122 that, when executed by the processor 101, compiles entire bytecode of an application into native machine code upon installation of the application which can be executed later by the processor 101. For example, bytecode of an Android application can be downloaded from the Internet and installed on the electronic device 100. During the installation, an AOT compiler included in an ART virtual machine can be used to compile the bytecode to native code. When the application is launched by a user, the compiled native code can be executed by the processor 101.

In a further example, the memory module 110 can include a memory space 140 storing other types of compilers which are not components of a virtual machine program, and can transform source code, such as code written in a high level programming language (such as C, Python, and the like), or bytecode for a specific type of virtual machine, into target code, such as native code including instructions executable directly by the processor 101.

In FIG. 1, the memory module 110 further includes a memory space 131 allocated for storing source code, and a memory space 132 allocated for storing native code. During a compiling process, the source code stored in the memory space 131 can be transformed into the native code using a compiler, such as the JIT compiler 121, the AOT compiler 122, or the other types of compliers in memory space 140, and the like, and stored in the memory space 132.

In an embodiment, a compiler, when executed by the processor 101, identifies BIVs and DIVs in a loop during a compiling process. A BIV i of a loop is a variable whose only definition in the loop is equivalent to i=i+c, where c is a loop-invariant expression, typically a constant. In other words, a BIV is a loop-inside variable which is explicitly modified by a same constant amount during each iteration of the loop. A DIV j of a loop is a variable that can be expressed as ci+d where i is a BIV, and c, d are loop invariant expressions.

In one example, the compiler first transforms a program from an initial form (e.g., a high level language, a bytecode, etc.) to a Static Single Assignment (SSA) form before operations of identifying BIVs and DIVs in a loop. The SSA form is an intermediate representation of programs under compilation, and some compiler optimization algorithms can be enabled or enhanced by the use of SSA. A program in SSA form is represented by renaming variables at their definition points so that each variable has a unique name, and is defined only once. Usually, an existing variable in an original form is split into versions typically indicated by the original name with a subscript, so that every definition has its own version of variable. A merge operator, called a phi-function (or φ-function), is inserted for a variable at a merge point of control flow of the program when a variable has more than one distinct reaching definition at that point.

FIGS. 2-4 show code fragments of a same loop in different forms during a compiling process. FIG. 2 shows a first code fragment 200 of the loop in form of a high level language. The loop counter i is a BIV with a step of 1. The BIV i has two definitions at the loop statement: a first definition, i=0, specifies an initial value of the BIV i; a second definition, i++(equivalent, i=i+1) updating the BIV in each iteration. FIG. 3 shows a second code fragment 300 of the loop in form of bytecode corresponding to a virtual machine. The second code fragment is converted from the first code fragment using a compiler corresponding to the virtual machine. In the bytecode form, registers, such as v1, v2, and v3, are used for storing different values and representing variables in the code fragment 200.

FIG. 4 shows a third code fragment 400 of the loop in SSA form converted from the second code fragment 300 using a compiler included in the virtual machine program. When in SSA form, a phi-function 401 is inserted in a loop head 402. In addition, different registers labelled with same names but different subscripts are used to represent multiple versions of a same variable in the code fragments 200 and 300. For example, the BIV i in the code fragments 200 is represented using the register v3 in the code fragment 300, however, the registers v3_0, v3_1, and v3_3 are used to represent different versions of the BIV i in the code fragment 400.

Figure 5:
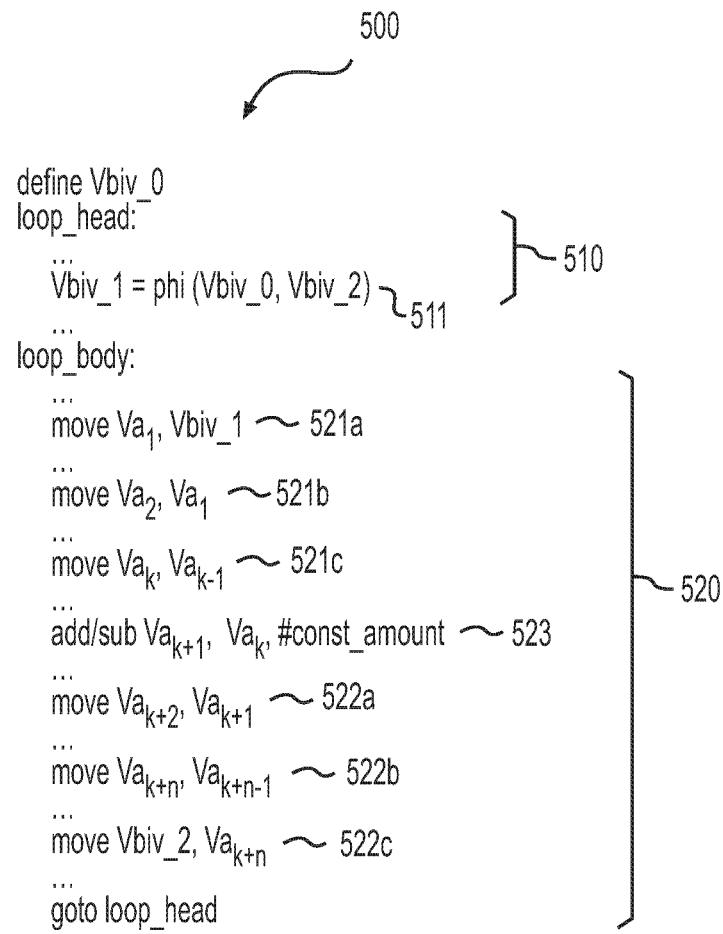
FIG. 5 shows a code pattern representing a generic structure of a category of loops that each includes a BIV according to an embodiment of the disclosure.

FIG. 5 shows a code pattern 500 representing a generic structure of a category of loops that each includes a BIV according to an embodiment of the disclosure. The code pattern 500 is in SSA form, and includes a loop head 510 and a loop body 520. The loop head 510 includes, in an instruction 511, a phi-function defining a BIV variable represented by a register Vbiv_1. The phi-function includes a first operand (register Vbiv_0) and a second operand (register Vbiv_2). The loop body 520 includes an addition instruction or a subtraction instruction. An add/sub instruction 523 in FIG. 5 is used to represent an addition instruction or subtraction instruction. The add/sub instruction 523 includes a first register $Va_{k+1}$, a second register $Va_k$, and a constant (#const_amount). The first register $Va_{k+1}$ stores a sum of values of the second register $Va_k$ and the constant (#const_amount) for an addition operation, and stores a difference of the values of the second register $Va_k$ and the constant (#const_amount) for an subtraction operation.

In other examples, an add/sub instruction in the code pattern 500 may take different forms. In one example, the add/sub instruction includes one register instead of the first and second registers in the add/sub instruction 523 but performs the same addition or subtraction operations as the instruction 523. For example, in an add/sub instruction having one register and a constant, the one register initially stores an initial value. After execution of the add/sub instruction, the one register stores the sum or difference of the initial value and the constant value. In another example, the add/sub instruction in the code pattern 500 includes a third register that stores the constant.

In addition, in one example, the loop body 520 can include a first group of move instructions 522a-522c, the last of which, "move Vbiv_2, $Va_{k+n}$", defines the second operand of the phi-function Vbiv_2, and the destination register $Va_{k+1}$ in the add/sub instruction 523 stores a value that is subsequently stored to the second operand of the phi-function Vbiv_2. Alternatively, in other examples of the code pattern 500, the loop body section 520 does not include any move instructions after the add/sub instruction 523, and the destination register $Va_{k+1}$ and the second operand of the phi-function Vbiv_2 are a same register.

Further, in one example, the loop body 520 can include a second group of move instructions 521a-521b, and the source register $Va_k$ in the add/sub instruction 523 stores a value that is passed from the BIV defined by the phi-function through the second group of move instructions 521a-521b. The number of the second group of move instructions 521a-521b can be variable. Alternatively, in other examples of the pattern 500, the loop body section 520 does not include any move instructions before the add/sub instruction 523, and the source register $Va_k$ and the BIV defined by the phi-function are a same register.

In the loop body 520, a register that stores a value passed from the BIV defined by the phi-function in the loop head 510 is referred to as a DIV of the BIV. For example, destination registers $Va_1$-$Va_k$ of the move instructions 521 are DIVs of the BIV. In addition, a register that stores a sum or difference of a constant and a value passed from the BIV defined by the phi-function in the loop head 510 is also referred to as a DIV of the BIV. For example, register $Va_{k+1}$ in the add/sub instruction 523, and registers $Va_{k+2}$-$Va_{k+n}$ are also DIVs of the BIV.

Figure 6:
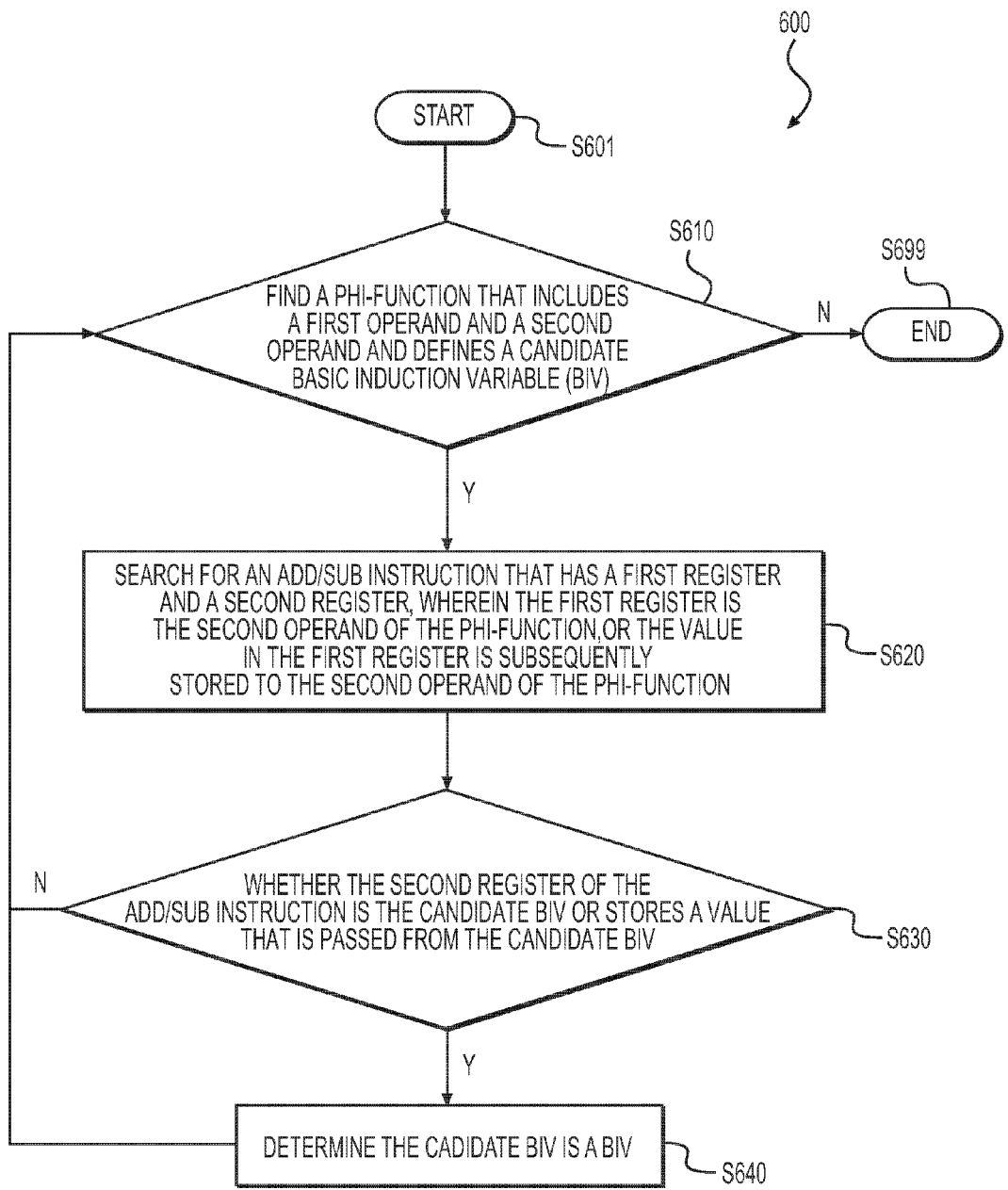
FIG. 6 shows a process for identifying a BIV in a loop according to an embodiment of the disclosure.

FIG. 6 shows a process 600 for identifying a BIV in a loop having the code pattern 500 shown in FIG. 5 according to an embodiment of the disclosure. The process 600 can be performed by a compiler, such as the JIT compiler 121 and the AOT compiler 122 stored in the memory space 120, and other types of compilers stored in the memory space 140 in the FIG. 1 example. The code in the code pattern 500 is used as an example to explain the process 600. The process 600 starts from S601, and proceeds to S610.

At S610, the compiler searches in the loop head 510 for a phi-function, such as the phi-function in the instruction 511. The phi-function includes a first operand (the resister Vbiv_0) and a second operand (the register Vbiv_2) and defines a candidate BIV (the register Vbiv_1). In various examples, the loop may include more than one phi-function. If a phi-function is found, the process 600 proceeds to S620. Otherwise, the process proceeds to S699 and terminates at S699.

At S620, the compiler searches in the loop body for an add/sub instruction. The add/sub instruction to be found has a first register and a second register. The first register stores a value that is a sum or difference of values of the second register and a constant as a result of the add/sub operation. In addition, the first register is the second operand of the phi-function, or the value in the first register is subsequently stored to the second operand of the phi-function through one or more move instructions in the loop body.

For the example of the code in FIG. 5, the instruction 523 is an add/sub instruction to be searched for. The instruction 523 includes a first register $Va_{k+1}$ and a second register $Va_k$. The instruction 523 also includes a constant (represented as #const_amount). The first register $Va_{k+1}$ stores a sum of values of the second register $Va_k$ and the constant for an addition operation, or stores a difference of values of the second register $Va_k$ and the constant for an subtraction operation. As shown, the value stored in the first register $Va_{k+1}$ is subsequently stored into the register Vbiv_2 at the instruction 522c through a sequence of move instructions 522a-522c. The register Vbiv_2 is the second operand of the phi-function in the instruction 511.

For another example (not shown in FIG. 5), the first register of the add/sub instruction to be found during search can be the same register as the second operand of the phi-function in the instruction 511. In this case, no move instruction is involved to pass the value in the first register of the add/sub instruction to the second operand of the phi-function.

In alternative examples, the add/sub instruction to be found during search can include one register that functions as the first register and the second register of the instruction 523. In addition, in other examples, the add/sub instruction to be found during search can include a third register storing a constant which does not change its value for each iteration of the loop.

At S630, the compiler determines whether the second register of the add/sub instruction found at S620 is the candidate BIV or stores a value that is passed from the candidate BIV through one or more move instructions in the loop body.

For the example of the code in FIG. 5, a value stored in the second register $Va_k$ in the instruction 523 is passed from the register Vbiv_1 through a sequence of move instructions 521a-521c and the register Vbiv_1 is the candidate BIV defined by the phi-function in the instruction 511. In alternative examples, the second register of the add/sub instruction found at S620 can be the candidate BIV. In this case, no move instruction is involved to pass the value of the candidate BIV to the second register of the add/sub instruction.

When the second register of the add/sub instruction found at S620 is the candidate BIV or stores a value that is passed from the candidate BIV through one or more move instructions in the loop body, the process 600 proceeds to S640.

Otherwise, the process 600 returns to S610 where the compiler searches for another phi-function.

At S640, the compiler determines the candidate BIV is a BIV based on results of S620 and S630. For example, the compiler may store the determined BIV in a list that is used in a later loop optimization process. After S640, the process 600 returns to S610.

Figure 7A:
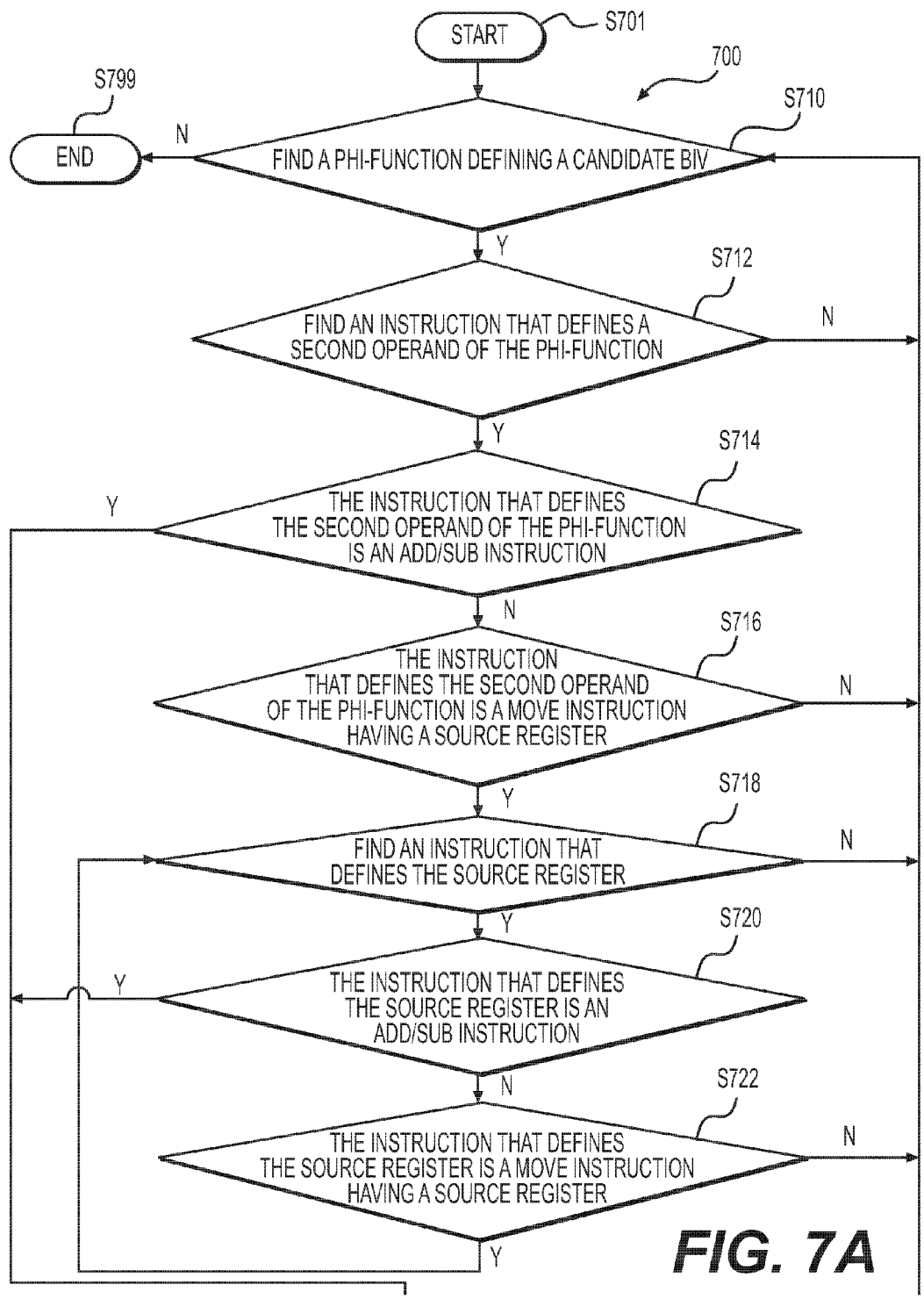
FIGS. 7A-7B shows a process for identifying BIVs and DIVs in a loop according to an embodiment of the disclosure.
Figure 7B:
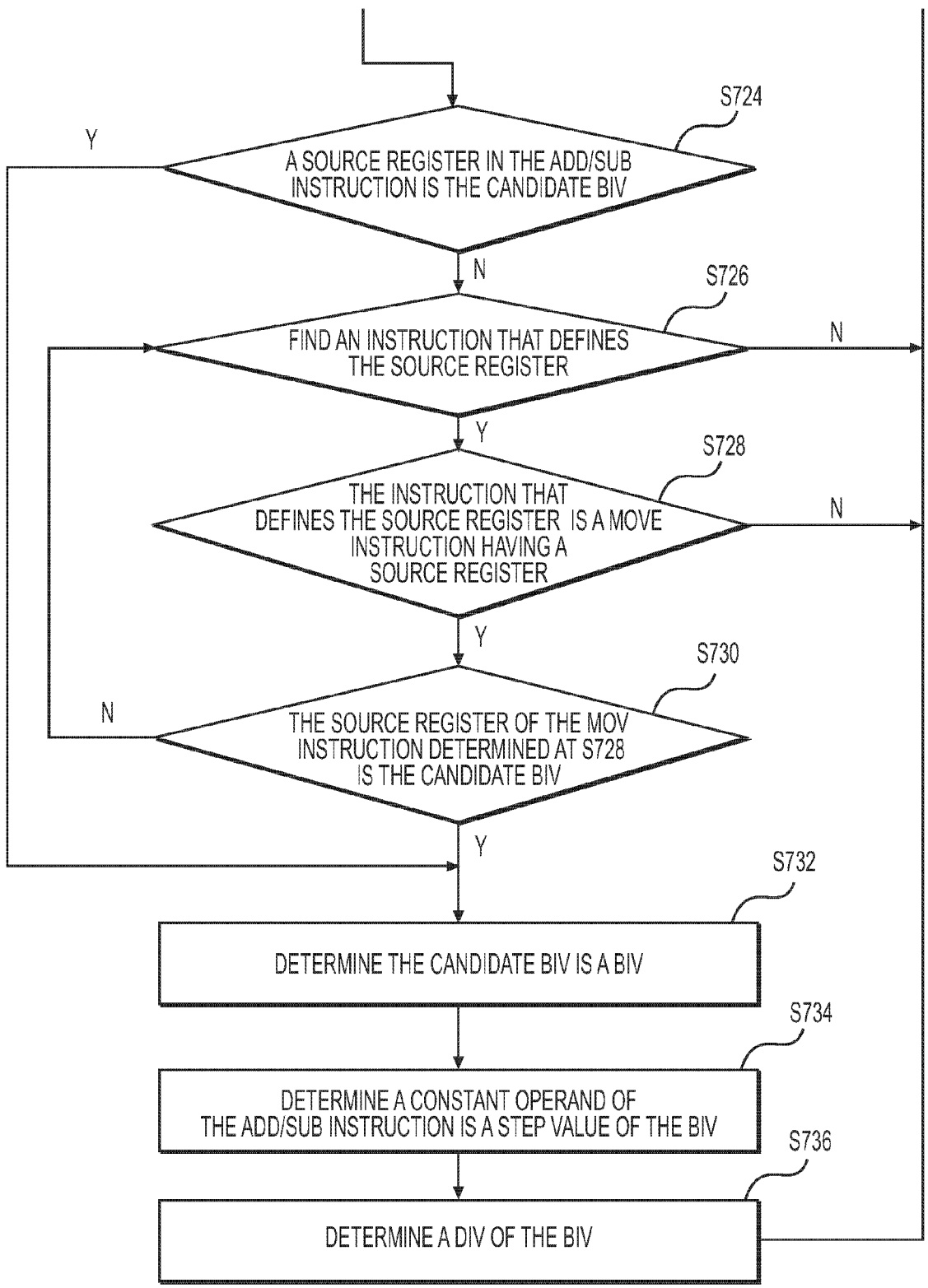

FIGS. 7A-7B shows a process 700 for identifying BIVs and DIVs in a loop having a code pattern 500 shown in FIG. 5 according to an embodiment of the disclosure. The process 700 is similar to the process 600 but includes more detailed. Similarly, the process 700 can be performed by a compiler, such as the JIT compiler 121 and the AOT compiler 122 stored in the memory space 120, and other types of compilers stored in the memory space 140 in the FIG. 1 example. The code in the code pattern 500 is used as an example to explain the process 700. The process 700 starts from S701, and proceeds to S710.

At S710, the compiler searches for a phi-function in the loop head 510 of the loop in the code pattern 500, which is the same as the operation of S610 in the process 600. When a phi-function is found, the process 700 proceeds to S712. Otherwise, the process 700 proceeds to S799, and terminates. In various examples, the loop head 510 can include more than one phi-functions, and accordingly, steps in the process 700 can be performed more than once.

From S712 to S722, operation of S620 in the process 600 is performed. Specifically, at S712, the compiler searches the loop body 520 for an instruction that defines a second operand of the phi-function, such as the instruction 522c that defines the register Vbiv_2 in the phi-function 511. If such an instruction is found, the process 700 proceeds to S714. Otherwise, the process 700 proceeds to S710.

At S714, the compiler determines whether the instruction that defines the second operand of the phi-function is an add/sub instruction. If the instruction is an add/sub instruction, the process 700 proceeds to S724. Otherwise, the process 700 proceeds to S716.

At S716, the compiler determines whether the instruction that defines the second operand of the phi-function is a move instruction, such as the instruction 522c. If the instruction is a move instruction, the process 700 proceeds to S718. Otherwise, for example, the instruction is a multiplication or division, the process 700 proceeds to S710.

At S718, the compiler searches the loop body for an instruction that defines source register of the move instruction determined at S716 (e.g., the instruction 522b that defines the source register $Va_{k+n}$ of the move instruction 522c), or an instruction that defines a source register of a move instruction determined at S722. If such an instruction is found, the process 700 proceeds to S720. Otherwise, the process 700 proceeds to S710.

At S720, the compiler determines if the instruction found at S718 is an add/sub instruction. If the instruction found at S718 is an add/sub instruction, the process 700 proceeds to S724. Otherwise, the process 700 proceeds to S722.

At S722, the compiler determines if the instruction found at S718 is a move instruction. If the instruction found at S718 is a move instruction, such as the instruction 522b, the process 700 proceeds to S718. Otherwise, for example, the instruction is a multiplication or division, the process 700 proceeds to S710.

From S724 to S730, operation of the S630 in the process 600 is performed. Specifically, at S724, the compiler determines whether second register of the add/sub instruction found at S714 or S720 (such as the second register $Va_k$ of the add/sub instruction 523) is the candidate BIV. If the source register is the candidate BIV, the process 700 proceeds to S732. Otherwise, the process 700 proceeds to S726.

At S726, the compiler searches for an instruction that defines the second register of the add/sub instructions found at S714 or S720 (e.g., the instruction 521*c* that defines the source register Va$_k$ of the add/sub instruction 523), or that defines a source register described at S730. If the instruction is found, the process proceeds to S728. Otherwise, the process 700 proceeds to S710.

At S728, the compiler determines whether the instruction found at S726 is a move instruction. If the instruction found at S726 is a move instruction (such as the instruction 521*c*), the process proceeds to S730. Otherwise, for example, the instruction found at s726 is an add/sub instruction, or a division instruction, etc., the process 700 proceeds to S710.

At S730, the compiler determines whether a source register of the move instruction determined at S728 (such as the source register Va$_{k-1}$ of the move instruction 521*c*) is the candidate BIV. If the source register is the candidate BIV, the process 700 proceeds to S730. Otherwise, the process 700 proceeds to S726.

At S732, the compiler determines the candidate BIV is a BIV of the loop, which is similar to the operation of S640 in the process 600.

At S734, the compiler determines a constant operand of the add/sub instruction found at S714 or S720 is a step value of the BIV. For example, the value of the constant #const_amount is determined to be a step value of the BIV.

At S736, the compiler determines one or more DIVs of the BIV. Specifically, the compiler determines destination register of the add/sub instruction found at S714 or S720 is a DIV that stores a value equal to a sum or difference of the candidate BIV and the constant operand. In addition, the compiler determines one or more destination registers of move instructions determined at S728 are DIVs corresponding to the BIV of the loop determined at S732. These destination registers each store a value that is passed from the candidate BIV. Further, the compiler determines one or more destination registers of move instructions determined at S716 are DIVs corresponding to the BIV of the loop determined at S732. These destination registers each store a value that is passed from the destination register of the add/sub instructions found at S720.

After S736, the process 700 returns to S710 where the compiler tries to find another phi-function.

FIGS. 8-10 show an example illustrating effect of a loop array range check hoisting optimization. The optimization is enabled by the BIV identification processes 600 or 700 described above. FIG. 8 shows a code fragment 800 of a loop in SSA form. The loop includes a phi-function in an instruction 810 in a loop head of the loop. The loop includes an add instruction 820 and a move instruction 830 in a loop body of the loop 800. It can be determined that the variable v3_7 is a BIV with a step value of 1, and variables v4_8, v6_5, v1_16, and v3_8 are DIVs of the BIV based on the process 600 or 700.

In addition, the loop includes two instructions 841 and 842 performing array access operations on two arrays, respectively. The instruction 841 stores a value of an element of an array into register v4_9. The array is referenced by register v15_0, and the element is indexed by register v4_8. The instruction 842 stores a value of an element of another array into register v6_6. The array is referenced by register v18_0, and the element is indexed by register v6_5.

FIG. 9 shows a code fragment 900 of native machine code. The code fragment 900 is compiled by a compiler in a virtual machine from the code fragment 900 assuming that no BIV identification has been performed, and further loop optimization, such as array range check hoisting, cannot be applied. In the loop body 920 of the code fragment 900, each line started with a dash line "--" is a comment containing a bytecode instruction followed by several machine code instructions compiled from the bytecode instruction.

As shown, the bytecode instruction 941 (labelled with 841 in FIG. 8) is converted to multiple machine code instructions. The multiple machine code instructions include two instructions 951 performing null check upon register r10 storing address of the referenced array, and three instructions 951 performing boundary (index range) check upon register r6 storing index of the referenced array element. Similarly, the bytecode instruction 942 (labelled with 842 in FIG. 8) is converted to multiple machine code instructions including null check instructions 961, and range check instructions 962. These instructions 951/952 and 961/962 are repeated for each iteration of the loop, and consequently, efficiency of the code fragment 900 without BIV identification and loop optimization is low.

FIG. 10 shows a code fragment 1000 of native machine code. The code fragment 1000 is compiled by a compiler in a virtual machine from the code fragment 800. In contrast to FIG. 9 example, the compiling process implemented the BIV identification process 600 or 700, and accordingly loop array range check hoisting optimization is performed based on identified BIVs and DIVs. Specifically, null check and index range check for instructions 1041 and 1051 in the loop body are moved outside of the loop and performed by instructions 1010 and 1020, respectively, located before the loop head of the code fragment 1000. As a result, efficiency of the code fragment 1000 is improved compared with the code fragment 1000.

In an example, loop BIV and DIV identification with further loop array range check hoisting optimization described above is implemented in an ART virtual machine. The optimization brings 30%-60% improvement for Linpack benchmark, 20% improvement for 0xbench benchmark, and 10% improvement for Antutu 4.x benchmark, compared with the ART virtual machine without implementation of BIV and DIV identification.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for identifying an induction variable in a loop during a compiling process, the loop being in static single assignment (SSA) form and including a loop head and a loop body, the method comprising:
   searching, by a processor, in the loop head for a phi-function that includes a first operand and a second operand and defines a candidate basic induction variable (BIV);
   searching, by the processor, in the loop body for an addition/subtraction (add/sub) instruction that has a first register and a second register, wherein the first register stores a value that is a sum or difference of values of the second register and a constant as a result of the add/sub operation, and wherein the first register is the second operand of the phi-function, or the value in the first register is subsequently stored to the second operand of the phi-function through one or more move instructions in the loop body, wherein searching in the loop body for an add/sub instruction includes:
searching for an instruction that defines the second operand of the phi-function in the loop body; and
determining whether the instruction that defines the second operand of the phi-function is an add/sub instruction;
when the instruction that defines the second operand of the phi-function is not an add/sub instruction, determining whether the instruction that defines the second operand of the phi-function is a move instruction;
when the instruction that defines the second operand of the phi-function is a move instruction, searching for an instruction that defines a source register of the move instruction;
determining whether the instruction that defines the source register of the move instruction is an add/sub instruction;
when the instruction that defines the source register of the move instruction is not an add/sub instruction, determining whether the instruction that defines the source register of the move instruction is another move instruction; and
when the instruction that defines the source register of the move instruction is another move instruction, searching for an instruction that defines a source register of the other move instruction;
determining, by the processor, whether the second register of the add/sub instruction is the candidate BIV or stores a value that is passed from the candidate BIV through one or more move instructions in the loop body; and
when the second register of the add/sub instruction is the candidate BIV or stores a value that is passed from the candidate BIV through one or more move instructions in the loop body, determining the candidate BIV is a BIV.

2. The method of claim 1, wherein determining whether a second register of the add/sub instruction stores a value that is passed from the candidate BIV through one or more move instructions in the loop body includes:
searching for an instruction that defines the second register of the add/sub instruction;
determining whether the instruction that defines the second register of the add/sub instruction is a move instruction whose source register is the candidate BIV; and
when the instruction that defines the second register of the add/sub instruction is a move instruction whose source register is not the candidate BIV, searching for an instruction that defines the source register of the move instruction.

3. The method of claim 1, further comprising:
searching in the loop head for another phi-function that includes a first operand and a second operand and defines a candidate basic induction variable (BIV).

4. The method of claim 1, further comprising:
determining the value of the constant in the add/sub instruction is a step value of the BIV.

5. The method of claim 1, further comprising:
determining the first register of the add/sub instruction is a dependent induction variable (DIV) of the BIV; and
determining a destination register in a move instruction in the loop body is a DIV of the BIV when the destination register in the move instruction stores a value that is passed from the candidate BIV or that is passed from the first register of the add/sub instruction through one or more move instructions.

6. The method of claim 1, wherein the first register and the second register of the add/sub instruction are a same register that stores a value that is a sum or difference of an initial value of the same register and a value of the constant as a result of the add/sub operation.

7. The method of claim 1, wherein the add/sub instruction includes a third register storing the constant.

8. The method of claim 1, further comprising:
transforming the loop to an optimized form based on the identified BIVs or/and DIVs.

9. An apparatus for identifying an induction variable in a loop during a compiling process, the loop being in static single assignment (SSA) form and including a loop head and a loop body, the apparatus comprising:
a processor configured to execute instructions; and
a memory configured to store instructions for causing the processor to:
search in the loop head for a phi-function that includes a first operand and a second operand and defines a candidate basic induction variable (BIV),
search in the loop body for an add/sub instruction that has a first register and a second register, wherein the first register stores a value that is a sum or difference of values of the second register and a constant as a result of the add/sub operation, and wherein the first register is the second operand of the phi-function, or the value in the first register is subsequently stored to the second operand of the phi-function through one or more move instructions in the loop body, and wherein searching in the loop body for an add/sub instruction includes:
search for an instruction that defines the second operand of the phi-function in the loop body,
determine whether the instruction that defines the second operand of the phi-function is an add/sub instruction,
when the instruction that defines the second operand of the phi-function is not an add/sub instruction, determine whether the instruction that defines the second operand of the phi-function is a move instruction,
when the instruction that defines the second operand of the phi-function is a move instruction, search for an instruction that defines a source register of the move instruction,
determine whether the instruction that defines the source register of the move instruction is an add/sub instruction;
determine whether the second register of the add/sub instruction is the candidate BIV or stores a value that is passed from the candidate BIV through one or more move instructions in the loop body, and
when the second register of the add/sub instruction is the candidate BIV or stores a value that is passed from the candidate BIV through one or more move instructions in the loop body, determine the candidate BIV is a BIV.

10. The apparatus of claim 9, wherein the memory is configured to store instructions for causing the processor to:
search for an instruction that defines the second register of the add/sub instruction; determine whether the instruction that defines the second register of the add/sub instruction is a move instruction whose source register is the candidate BIV; and when the instruction that defines the second register of the add/sub instruction is a move instruction whose source register is not the candidate BIV, search for an instruction that defines the source register of the move instruction.

11. The apparatus of claim 9, wherein the memory is configured to store instructions for causing the processor to:
search in the loop head for another phi-function that includes a first operand and a second operand and defines a candidate basic induction variable (BIV).

12. The apparatus of claim 9, wherein the memory is configured to store instructions for causing the processor to:
determine the value of the constant in the add/sub instruction is a step value of the BIV.

13. The apparatus of claim 9, wherein the memory is configured to store instructions for causing the processor to:
determine the first register of the add/sub instruction is a dependent induction variable (DIV) of the BIV; and
determine a destination register in a move instruction in the loop body is a DIV of the BIV when the destination register in the move instruction stores a value that is passed from the candidate BIV or that is passed from the first register of the add/sub instruction through one or more move instructions.

14. The apparatus of claim 9, wherein the first register and the second register of the add/sub instruction are a same register that stores a value that is a sum or difference of an initial value of the same register and a value of the constant as a result of the add/sub operation.

15. The apparatus of claim 9, wherein the add/sub instruction includes a third register storing the constant.

16. The apparatus of claim 9, wherein the memory is configured to store instructions for causing the processor to:
transform the loop to an optimized form based on the identified BIVs or/and DIVs.

* * * * *